3,364,060
FINISHING COAT ON PLASTICIZED POLYVINYL CHLORIDE
Gerhard Welzel and Gerhard Faulhaber, Mannheim, Germany, assignors to Badische Anilin- & Soda-Fabrik Aktiengesellschaft, Ludwigshafen (Rhine), Germany
No Drawing. Filed Feb. 23, 1965, Ser. No. 434,662
6 Claims. (Cl. 117—76)

ABSTRACT OF THE DISCLOSURE

Process of finish or top coating plasticized polyvinyl chloride by applying thereto an aqueous dispersion of copolymer of (A) methyl methacrylate, (B) the esters of acrylic, methacrylic, fumaric and maleic acids with diols or triols containing a chlorine substitutent in $\alpha$-position to a free hydroxy group, and if desired one or more other ethylenically unsaturated polymerizable monomers, and subsequently drying the applied coating. For example, one may use an aqueous despersion of a copolymer of 82% by weight of methyl methacrylate, 10% by weight of the acrylic acid ester of 3-chloropropanediol-1, 2, and 8% by weight of butyl acrylate. The resulting dried coating is useful as an adherent, tack-free protective finish for the plasticized polyvinyl chloride.

---

This invention relates to the use of a special copolymer based on methyl methacrylate, in the form of an aqueous dispersion, for the production of a finishing coat on plasticized polyvinyl chloride.

Plasticized polyvinyl chloride as a rule contains a large amount of a plasticizer. Because plasticized polyvinyl chloride has a more or less tacky surface depending on the content of plasticizer, such plasticized polyvinyl chloride is provided with a finishing, or top, coat. Various products are already known which are suitable as such a finishing coat on plasticized polyvinyl chloride. Finishing coats should not block and should have an adequate elasticity and a good adhesion to the plasticized polyvinyl chloride. Moreover they should have an adequate surface hardness and resistance to the conventional plasticizers for polyvinyl chloride.

Polyamides, applied from solution in methanol, have already been used as finishing coats for plasticized polyvinyl chloride. Polyurethanes obtained by mixing two components based on isocyanates and polyesters or polyethers and dissolved in organic solvents have also already been used as materials for finishing coats. The use of polymethyl methacrylate, dissolved in an organic solvent, as a coating agent for plasticized polyvinyl chloride is also known.

Prior art products suitable for a finishing coat on plasticized polyvinyl chloride have usually had to be applied from organic solvents to the soft polyvinyl chloride.

We have now found that a finishing coat on plasticized polyvinyl chloride which has a good adhesion and an excellent resistance to plasticizers is obtained by using for this finishing coat an aqueous dispersion of a copolymer of:

(A) 40 to 90% by weight of methyl methacrylate;
(B) 1 to 20% by weight of an ester of a polymerizable $\alpha,\beta$-ethylenically unsaturated carboxylic acid or dicarboxylic acid with a polyhydric alcohol which bears a chlorine atom in $\alpha$-position to a free hydroxyl group and, optionally,
(C) up to 59% by weight of one or more other ethylenically unsaturated polymerizable compounds, the sum of the percentages of A, B and C totaling 100%.

Copolymers to be used according to this invention should contain 40 to 90% by weight of copolymerized methyl methacrylate units. Chlorohydrin esters of acrylic, methacrylic, fumaric and maleic acids are particularly suitable as esters of polymerizable $\alpha,\beta$-ethylenically unsaturated carboxylic or dicarboxylic acids with polyhydric alcohols bearing a chlorine atom in $\alpha$-position to a free hydroxyl group. These acids may also be substituted, for example by halogen or hydroxyl groups. Examples of polyhydric alcohols which have a chlorine atom in $\alpha$-position to a free hydroxyl group and which are esterified with the $\alpha,\beta$-ethylenically unsaturated polymerizable carboxylic acids are:

3-chloropropanediol-(1,2),
(2,3)-dichlorobutanediol-(1,4),
3-chlorobutanetriol-(-1,2,4),
(1,4)-dichlorobutanediol-(2,3),
3-chloro-2-methylpropanediol-(1,2) and
3-chloro-2-chloromethylpropanediol-(1,2).

These esters, forming component (B) should be contained in the copolymer to the extent of 1 to 20% by weight.

Other polymerizable compounds may be additionally used in the synthesis of the copolymers. It is often advantageous for example to copolymerize small amounts of acrylic acid or methacrylic acid, because adhesion may be further improved in this way. Monomers which yield hard polymers, such as acrylonitrile or methacrylonitrile, and monomers which form soft polymers, as for example acrylic esters of alcohols having one to eighteen carbon atoms, may also be added, but these monomers should not be used in amounts of more than 59% in all.

Polymers of the above-mentioned monomers are used in the form of their aqueous dispersions. They are generally obtained as aqueous dispersions by polymerization, the dispersions having a polymer content of from about 25 to 60.

For better applicability, it is often advantageous to thicken the aqueous dispersions with suitable thickening agents prior to use. The dispersion which may be thickened to a paste, is advantageously applied to the plasticized polyvinyl chloride by means of a coating knife and dried at temperatures above 100° C. Where pastes of plasticizer and polyvinyl chloride are being used to coat suitable substrates, it is recommended that the plasticized polyvinyl chloride be pregelled at about 120° to 130° C., the finishing coat then spread on and gelling completed at about 170° to 180° C.

Particularly advantageous results are obtained when, additionally to the dispersion of the copolymer of the components A, B and C, there are used precondensates of formaldehyde with urea or melamine in amounts of 5 to 60% by weight with reference to the solids content of the aqueous dispersion of the copolymer of A, B and C.

Aminoplasts, such as dimethylolpropylenurea, dimethylolethylenurea, N,N',N'',N''' - tetramethylologlyoxaldiureine, N,N'-dimethylolglyoxalmonoureine or N,N'-dimethylolurea etherified with methanol are suitable precondensates of formaldehyde with urea or melamine.

These reactant resins are applied to the plasticized polyvinyl chloride together with the aqueous dispersions of the copolymers.

The invention is further illustrated by the following examples. The parts and percentages in the examples are by weight.

*Example 1*

A coating, pregelled at 120° C. and consisting of a paste of 60 parts of polyvinyl chloride and 40 parts of dioctyl phthalate, is thinly coated with a paste of 5 parts of a 20% aqueous solution of a copolymer based on vinylpyrrolidone, 1 part of a 20% aqueous solution of sodium bicarbonate and 94 parts of a 40% aqueous dispersion of a copolymer of 82% of methyl methacrylate, 10% of 3-chloro-2-oxypropyl acrylate and 8% of butyl acrylate, dried at 110° C. and then the whole is gelled at about 170° C. and finally embossed.

The top coat thus obtained is colorless, flexible and scratchproof and adheres well to the plasticized polyvinyl chloride.

*Example 2*

Similar results to those described in Example 1 are obtained when, under otherwise identical conditions, an aqueous dispersion of a copolymer of 66% of methyl methacrylate, 15% of 3-chloro-2-oxypropyl acrylate, 5% of butyl acrylate, 13% of acrylonitrile and 1% of acrylic acid is used.

*Example 3*

A cloth is coated with a paste consisting of 60 parts of polyvinyl chloride powder and 40 parts of dioctyl phthalate as plasticizer, pregelled at 120° C. and then gelled at 170° C. The following mixture is then applied:

100 parts of a copolymer ABC of 45 parts of methyl methacrylate, 20 parts of chloroxypropanol half-ester of maleic acid, 20 parts of styrene, 14 parts of butyl acrylate and 1 part of N-methylolmethacrylamide, in the form of a 40% aqueous dispersion, 5 parts of a 20% aqueous solution of a copolymer based on vinylpyrrolidone (as thickening agent), 2 parts of a 10% aqueous solution of a wetting agent based on isopropylisohexylnaphthalene potassium and 75 parts of water. The coating is then dried at 120° C. A completely tack-free coating is obtained.

The same result is obtained by using a copolymer ABC from:
  (a) 60% of methyl methacrylate, 8% of the chloroxypropanol half-ester of maleic acid, 10% of vinyl acetate, 5% of acrylonitrile, 16% of n-butyl acrylate and 1 part of acrylic acid, or
  (b) 90% of methyl methacrylate, 4% of the chloroxypropanol diester of maleic acid, 5% of hexyl acrylate and 1% of acrylic acid, or
  (c) 55% of methyl methacrylate, 12% of chloroxypropanol half-ester of maleic acid, 13% of acrylonitrile, 18% of ethyl acrylate and 2% of methyl acrylate.

Similarly outstanding results are obtained at a drying temperature of 175° C. when using a copolymer ABC of:
  (d) 75% of methyl methacrylate, 5% of chloroethoxypropyl acrylate, 5% of chloroxymethyl methacrylate, 5% of α-methylstyrene and 10% of hexyl acrylate, or
  (e) 89.6% of methyl methacrylate, 4.4% of chloroxypropyl acrylate, 5% of hexyl acrylate and 1% of acrylic acid.

*Example 4*

A cloth is coated with a paste of 60 parts of polyvinyl chloride powder and 40 parts of dioctyl phthalate as plasticizer which is pregelled at 120° C. and gelled at 170° C. A mixture is then applied having the following composition:

100 parts of a dispersion of a 40% aqueous copolymer ABC of 45% of methyl methacrylate, 20% of the chloroxypropanol half-ester of maleic acid, 20% of styrene, 14% of n-butyl acrylate and 1% of N-methylolmethacrylamide, 20 parts of a 50% aqueous solution of dimethylolethyleneurea, 2 parts of a 10% aqueous solution of ammonium chloride, 2 parts of a 10% aqueous solution of isopropylisohexylnaphthalene as wetting agent, 5 parts of a 20% aqueous solution of a coplymer based on vinylpyrrolidone as thickener and 75 parts of water.

A completely tack-free finishing coat is obtained after drying at 175° C.

Analogous results are achieved by coating the abovementioned cloth coated with plasticized polyvinyl chloride by using the following formulations for the preparation of the coating composition and drying at 175° C.:

(a) 100 parts of a 40% aqueous dispersion of a copolymer ABC of 60% methyl methacrylate, 8% of chloroxypropanol methacrylate, 10% of vinyl acetate, 5% of acrylonitrile, 16% of n-butyl acrylate and 1% of acrylic acid, 20 parts of a 50% aqueous solution of dimethylolpropylenurea, 2 parts of a 10% aqueous solution of ammonium chloride, 2 parts of a 10% aqueous solution of a wetting agent, 5 parts of a 20% aqueous solution of a thickener and 75 parts of water; or
  (b) 100 parts of a 40% aqueous emulsion of a copolymer ABC of 75% of methyl methacrylate, 5% of chloroxypropyl acrylate, 5% of acrylic acid chloroxypropanol methacrylate, 5% of α-methylstyrene and 10% of hexyl acrylate, 20 parts of a 50% aqueous solution of dimethylolglyoxalmonoureine, 2 parts of a 10% aqueous solution of ammonium chloride, 2 parts of a 10% aqueous solution of a wetting agent and 5 parts of a 20% aqueous solution of a thickener and 75 parts of water.

*Example 5*

100 parts of a 40% aqueous dispersion of 65% of methyl methacrylate, 14% of n-butyl acrylate, 14% of acrylonitrile, 6% of 3-chloro-2-oxypropyl acrylate and 1% of acrylic acid are mixed with 30 parts of a 50% aqueous solution of tetramethylolglyoxaldiureine, 3 parts of a 10% aqueous solution of ammonium chloride, 5 parts of a 20% aqueous solution of a copolymer of 2 parts of vinyl pyrrolidone, and 1 part of vinyl propionate, and 2 parts of a 10% aqueous solution of a wetting agent based on sodium isopropylisohexylnaphthalene sulfonate. The mixture is coated thinly onto a plasticized polyvinyl chloride coating on cloth which has been gelled at 170° C., dried at 160° C. and then embossed. A very adherent, tack-free top coat is obtained.

*Example 6*

100 parts of a 45% dispersion of a copolymer of 45% of methyl methacrylate, 25% of styrene, 15% of 3-chloro-2-oxypropyl acrylate, 14% of acrylonitrile and 1% of acrylic acid are mixed with 40 parts of a 50% aqueous solution of tetramethylolglyoxaldiureine, 4 parts of a 10% aqueous ammonium chloride solution, 2 parts of a 10% aqueous solution of sodium isopropylisohexylnaphthalene sulfonate and 5 parts of a 20% aqueous solution of a copolymer of 2 parts of vinyl pyrrolidone and 1 part of vinyl propionate. The mixture obtained is applied to plasticized polyvinyl chloride and after treated as in Example 5. A very adherent tack-free top coating is obtained.

*Example 7*

A mixture having the following composition is applied in a manner analogous to that in Example 4 to a plasticized polyvinyl chloride:

A copolymer ABC of 70 parts of methyl methacrylate, 3 parts of chloroxypropanol maleic acid diester, 6 parts of chloroxypropanol methacrylate, 5 parts of acrylonitrile, 15 parts of n-butyl acrylate, 1 part of N-methylolmethacrylamide as a 40% aqueous dispersion, 140 parts of a 50% aqueous solution of tetramethylolglyoxaldiureine and 2 parts of a 10% aqueous solution of a wetting agent and 5 parts of a 20% aqueous solution of a thickener, 2 parts of a 10% aqueous solution of ammonium chloride and 75 parts of water.

A completely tack-free, well cured coating is obtained at a drying temperature of 175° C.

We claim:

1. A process for the production of a finishing coat on a plasticized polyvinyl chloride coating which comprises: surface coating said plasticized polyvinyl chloride coating with an aqueous dispersion of a copolymer of
  (A) 40 to 90% by weight of methyl methacrylate,
  (B) 1 to 20% by weight of an ester selected from class consisting of the esters of acrylic acid, methacrylic acid, maleic acid and fumaric acid with polyhydric alcohols bearing 2 to 3 free hydroxyl groups and a chlorine atom in α-position to a free hydroxyl group, and (C) up to 59% by weight of another ethylenically unsaturated polymerizable compound, the sum of the percentages of (A), (B), and (C) totaling 100; and then drying said surface coating at an elevated temperature.

2. A process as claimed in claim 1 wherein there is applied to the plasticized polyvinyl chloride coating, together with said aqueous dispersion of said copolymer, about 5 to 60% by weight, with reference to the solid copolymer content of the dispersion, of a precondensate of formaldehyde with a compound selected from the class consisting of urea and melamine.

3. A process as claimed in claim 1 wherein said polyhydric alcohol of component (B) is 3-chloropropanediol-1,2.

4. A process as claimed in claim 1 wherein said surface coating is dried at a temperature above 100° C.

5. A process as claimed in claim 1 wherein component (C) is a compound selected from the class consisting of acrylic acid, methacrylic acid, acrylonitrile, methacrylonitrile, styrene, methyl methacrylate and the acrylic esters of 1 to 18 carbon atoms alkanols.

6. A process as claimed in claim 1 wherein the plasticized polyvinyl chloride is initially applied as a base coat on a substrate and pregelled at about 120° C. to 130° C., the aqueous dispersion of said copolymer is then applied as a top coat, and gelling is then completed while drying at a temperature of about 170° C. to 180° C.

References Cited

UNITED STATES PATENTS

| 3,083,171 | 3/1963 | Aronoff et al. | 260—29.6 |
| 3,201,497 | 8/1965 | Heino | 260—836 |
| 3,245,925 | 4/1966 | Watson | 260—836 |
| 3,301,919 | 1/1967 | Cenci et al. | 260—29.6 |

OTHER REFERENCES

"Epoxy Resins," Lee et al., McGraw-Hill, 1957, TP 986 E6L4 p. 10.

GEORGE F. LESMES, *Primary Examiner.*

MURRAY TILLMAN, *Examiner.*

J. C. BLEUTGE, *Assistant Examiner.*